United States Patent
Hoberock et al.

(10) Patent No.: US 8,212,816 B1
(45) Date of Patent: Jul. 3, 2012

(54) SYSTEM, METHOD, AND COMPUTER PROGRAM PRODUCT FOR PARALLEL RAY TRACING TRAVERSAL AND INTERSECTION UTILIZING A SINGLE INSTRUCTION MULTIPLE DATA (SIMD) PROCESSING ARCHITECTURE

(75) Inventors: Jared Hoberock, Champaign, IL (US); Samuli M. Laine, Vantaa (FI); David Patrick Luebke, Charlottesville, VA (US)

(73) Assignee: NVIDIA Corporation, Santa Clara, CA (US)

( * ) Notice: Subject to any disclaimer, the term of this patent is extended or adjusted under 35 U.S.C. 154(b) by 1231 days.

(21) Appl. No.: 11/958,259

(22) Filed: Dec. 17, 2007

(51) Int. Cl.
  *G06T 15/50* (2011.01)
(52) U.S. Cl. .......................................... 345/426
(58) Field of Classification Search ............... 345/426
  See application file for complete search history.

(56) References Cited

U.S. PATENT DOCUMENTS

| | | | | |
|---|---|---|---|---|
| 6,559,843 B1* | 5/2003 | Hsu | | 345/421 |
| 6,597,359 B1* | 7/2003 | Lathrop | | 345/440 |
| 7,002,571 B2* | 2/2006 | Lake et al. | | 345/420 |
| 7,644,402 B1* | 1/2010 | Daynes et al. | | 717/166 |
| 2008/0024489 A1* | 1/2008 | Shearer | | 345/421 |

OTHER PUBLICATIONS

U.S. Appl. No. 11/927,099, filed Oct. 29, 2007.
Sengupta et al., "Scan Primitives for GPU Computing," Proceedings of Graphics Hardware 2007, San Diego, CA, Aug. 4-5, 2007.
Blelloch, "Prefix Sums and Their Applications," Carnegie Mellon University School of Computer Science, Technical Report CMU-CS-90-190, Nov. 1990.
U.S. Appl. No. 11/862,938 which was filed Sep. 27, 2007.
D. Naishlos, J. Nuzman, C-W. Tseng, and U. Vishkin, 2001. Towards a first vertical prototyping of an extremely fine-grained parallel programming approach. In *Proc. 13th ACM Symposium on Parallel Algorithms and Architecture (SPAA 01)*, Jul. 2001. http://www.umiacs.umd.edu/users/vishkin/XMT/spaa01.pdf.
U.S. Appl. No. 11/942,608, which was filed Nov. 19, 2007.
S.-E. Yoon, P. Lindstrom, V. Pascucci, and D. Manocha. "Cache-oblivious mesh layouts." *ACM Transactions on Graphics*, Proc. SIGGRAPH 2005, 24(3), Jul. 2005.
V. Havran and J. Bittner. "Efficient sorting and searching in rendering algorithms." *Eurographics 2006 Tutorials*, Tutorial T4, Aug. 2006. http://moon.felk.cvut.ez/~havran/eg2006tut/tut4eg06.pdf.
U.S. Appl. No. 11/938,091, filed Nov. 9, 2007.
U.S. Appl. No. 11/874,093, filed Oct. 17, 2007.
I. Kamel and C. Faloutsos. "On Packing R-trees." In *Proc. 2nd Int'l Conf. on Information & Knowledge Management*, Nov. 1993.
V. Pascucci and R. Frank. "Global Static Indexing for Real-time Exploration of Very Large Regular Grids." In *Proc. Supercomputing 2001*, Nov. 2001.

(Continued)

*Primary Examiner* — Edward Martello
(74) *Attorney, Agent, or Firm* — Zilka-Kotab, PC (57) ABSTRACT

A system, method, and computer program product are provided for parallel ray tracing traversal and intersection utilizing a single instruction multiple data (SIMD) processing architecture. In operation, a ray tracing traversal operation is performed utilizing one or more processing elements of the SIMD architecture. Additionally, a ray tracing intersection operation is performed in parallel with the ray tracing traversal operation, utilizing the same one or more processing elements. Furthermore, at least a portion of code utilized for performing the ray tracing traversal operation is the same as at least a portion of code utilized for performing the ray tracing intersection operation.

23 Claims, 4 Drawing Sheets

OTHER PUBLICATIONS

U.S. Appl. No. 11/940,782, filed Nov. 15, 2007.
U.S. Appl. No. 11/950,193, filed Dec. 4, 2007.
U.S. Appl. No. 11/958,240, filed Dec. 17, 2007.
U.S. Appl. No. 11/956,108, filed Dec. 13, 2007.
U.S. Appl. No. 11/956,060, filed Dec. 13, 2007.
U.S. Appl. No. 11/956,137, filed Dec. 13, 2007.
Blelloch, G. E., Vector Models for Data-Parallel Computing, The MIT Press, 1990, USA and England (264 pages).
Thinking Machines Corporation, Connection Machine Model CM-2 Technical Summary, Version 6.0, Nov. 1990, USA (118 pages).
Wald, I. Realtime Ray Tracing and Interactive Global Illumination, Dissertation Thesis, Jan. 21, 2004, Germany (311 pages).
Havran, V. et al., Efficient Sorting and Searching in Rendering Algorithms, Eurographics 2006 Tutorial T4, The Eurographics Association, Version 1.1, Aug. 31, 2006, Prague (74 pages).
Horn, D. R. et al., Interactive k-D Tree GPU Raytracing, Proceedings of the 2007 symposium on Interactive 3D graphics and games, ACM, 2007, USA, pp. 167-174 (8 pages).
Popov, S. et al. Stackless KD-Tree Traversal for High Performance GPU Ray Tracing, Eurographics 2007, Eurographics Association and Blackwell Publishing, vol. 26, No. 3, Oct. 12, 2007, UK and USA, pp. 415-424 (10 pages).
Wachter, C. et al., Instant Ray Tracing: The Bounding Interval Hierarchy, Eurographics Symposium on Rendering (2006), The Eurographics Association, 2006, Germany, pp. 139-149 (11 pages).
Gunther, J. et al., Realtime Ray Tracing on GPU with BVH-based Packet Traversal, to appear in the IEEE/Eurographics Symposium on Interactive Ray Tracing 2007, IEEE Computer Society, 2007, Washington D.C., pp. 113-118 (6 pages).
Harris, M., Parallel Prefix Sum (Scan) with CUDA, nVIDIA Corporation, Apr. 2007 (21 pages).

* cited by examiner

SYSTEM, METHOD, AND COMPUTER PROGRAM PRODUCT FOR PARALLEL RAY TRACING TRAVERSAL AND INTERSECTION UTILIZING A SINGLE INSTRUCTION MULTIPLE DATA (SIMD) PROCESSING ARCHITECTURE

FIELD OF THE INVENTION

The present invention relates to single instruction multiple data (SIMD) processing architectures, and more particularly to ray tracing utilizing such architectures.

BACKGROUND

In some processor cores of current parallel multiprocessors, numerous threads may be executed concurrently. Furthermore, the threads may be packed together into groups, here called "warps," which are executed in a single instruction multiple data (SIMD) fashion, meaning that at any one instant, all threads within a warp are executing the same instruction on their own private data values. If different threads within a warp need to execute different instructions, each thread must execute its desired operation while all other threads that do not wish to execute this operation are idle. This condition, known as divergence, is often undesirable as idling threads are unutilized, thus reducing total computational throughput.

The foregoing parallel multiprocessors are capable of many different applications. For instance, much effort has been made to adapt ray tracing algorithms to work well with such architectures. Ray tracing involves a technique for determining the visibility of an object or objects from a given point, such as, but not limited to an "eye" or "camera" point, by following a ray. While such techniques theoretically can involve testing a vast number of rays against each and every geometric primitive, this is typically not practical. Instead, designers have used various data structures to identify a subset of such primitives to be involved in the testing, thereby reducing required processing.

To accomplish this, objects are typically organized in a tree-structured spatial hierarchy, such as a bounding volume hierarchy (BVH), a kd-tree (k-dimensional tree), or a binary space partitioning (BSP) tree. However, determining how to traverse such a tree efficiently and find the object or objects that are intersected by a given ray may pose a challenge, particularly with single instruction multiple data processing architectures. For example, when formulating ray tracing algorithms on a graphics processing unit (GPU), care must be taken when assigning rays and traversal tests to the various parallel threads of execution, in order to minimize the aforementioned divergence due to the different threads in a warp making different decisions, etc.

In the context of ray tracing using a SIMD architecture, each thread may trace a ray through a data structure. In this case, each ray will need to be traversed through one or more nodes until it reaches a node containing more than one primitive, then each ray may be intersected with the set of primitives (e.g. triangles, splines, spheres, etc.) in that node. If the ray intersects a primitive within the node, the ray is complete and an intersection may be shaded (e.g. colored) and more rays may be generated. If no primitive is intersected in the node, the ray begins traversing nodes again, until the ray reaches a non-empty node and again starts intersecting primitives.

During this traversal and intersection cycle, different factors may cause SIMD divergence. For example, rays may hit a primitive and terminate such that the corresponding thread is masked off and inactive for all future traversal and intersection phases. In another case, rays may finish a traversal step at different times and then wait for the remaining threads in the SIMD group to finish traversing before the group may enter the intersection phase. Additionally, rays may intersect primitives bound to different shaders such that when the intersections enter a shade phase, different code is executed. There is thus a need for addressing these and/or other issues associated with the prior art.

SUMMARY

A system, method, and computer program product are provided for parallel ray tracing traversal and intersection utilizing a single instruction multiple data (SIMD) processing architecture. In operation, a ray tracing traversal operation is performed utilizing one or more processing elements of a single instruction multiple data processing architecture. Additionally, a ray tracing intersection operation is performed in parallel with the ray tracing traversal operation, utilizing the same one or more processing elements.

DETAILED DESCRIPTION

Figure 1:
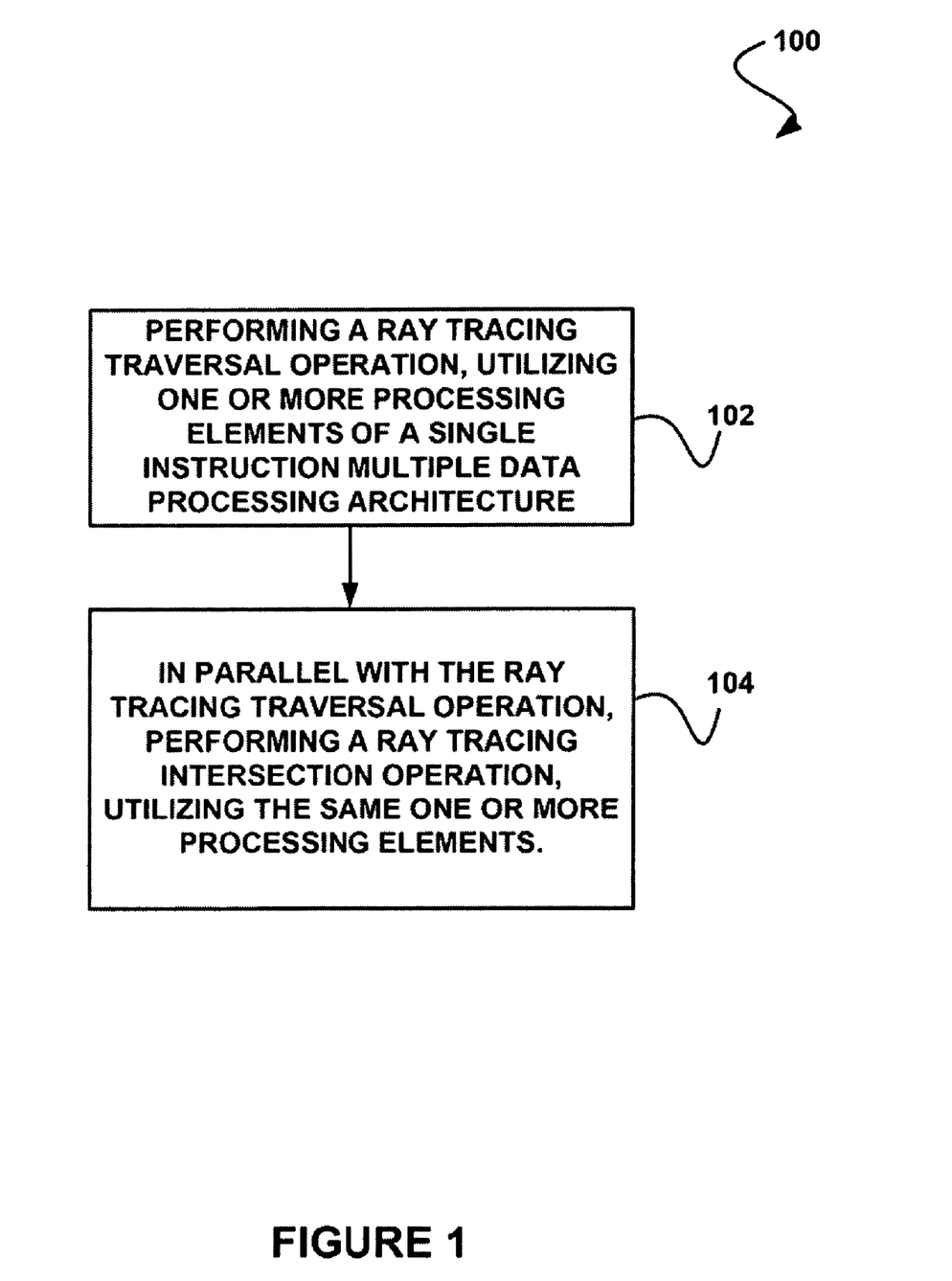
FIG. 1 shows a method for parallel ray tracing traversal and intersection utilizing a single instruction multiple data (SIMD) processing architecture, in accordance with one embodiment of the present invention.

FIG. 1 shows a method 100 for parallel ray tracing traversal and intersection utilizing a single instruction multiple data processing architecture, in accordance with one embodiment of the present invention. As shown, a ray tracing traversal operation is performed utilizing one or more processing elements of a single instruction multiple data (SIMD) processing architecture. See operation 102.

In the context of the present description, ray tracing traversal refers to any operation which includes traversing a data structure (e.g. a data tree) or representative data structure with a ray/segment or group of rays/segments for determining one or more primitives (e.g., triangles, polygons, spheres, boxes, splines, etc.) or groups containing primitives which may intersect or nearly intersect a ray/segment. Furthermore, in various embodiments, the SIMD processing architecture may include a graphics processor [e.g. a graphics processing unit (GPU), etc.], a central processing unit (CPU), and/or any other processing architecture capable of operating in SIMD or SIMD-like fashion. Additionally, the processing elements may include any elements or devices capable of processing data. For example, in various embodiments the processing elements may include vector processing elements, threads of a processor (e.g. a GPU, CPU, etc.), and/or any other element used in the context of processing in a SIMD architecture.

As shown further, a ray tracing intersection operation is performed in parallel with the ray tracing traversal operation, utilizing the same one or more processing elements. See operation 104. In this case, the SIMD architecture utilized to perform the ray tracing intersection operation is the same SIMD architecture used to perform the ray tracing traversal operation. For example, the ray tracing traversal operation and the ray tracing intersection operation may be performed simultaneously utilizing the same vector processing elements or threads of a GPU or CPU, etc. In this way, the ray tracing traversal operation and the ray tracing intersection operation may be performed in parallel for reducing divergence in the SIMD architecture.

In the context of the present description, a ray tracing intersection operation refers to any operation which involves intersecting a ray/segment or group of rays/segments with a primitive of group of primitives. For example, the ray tracing intersection operation may be performed on a primitive or group of primitives associated with a node of a data structure. In one embodiment, such node may refer to a bounded volume or a subset of data (e.g. primitives) included in the data structure.

Still yet, in various embodiments, the data structure may include a bounding volume hierarchy (BVH), a kd-tree (k-dimensional tree), a binary space partitioning (BSP) tree, or any other data structure. As an option, the data structure may include a BVH which corresponds to a plurality of bounding volumes. In one embodiment, ray tracing may be performed utilizing the data structure.

More illustrative information will now be set forth regarding various optional architectures and features with which the foregoing framework may or may not be implemented, per the desires of the user. For instance, various exemplary embodiments will be set forth for providing the aforementioned parallelism. It should be strongly noted that the following information is set forth for illustrative purposes and should not be construed as limiting in any manner. Any of the following features may be optionally incorporated with or without the exclusion of other features described.

Figure 2:
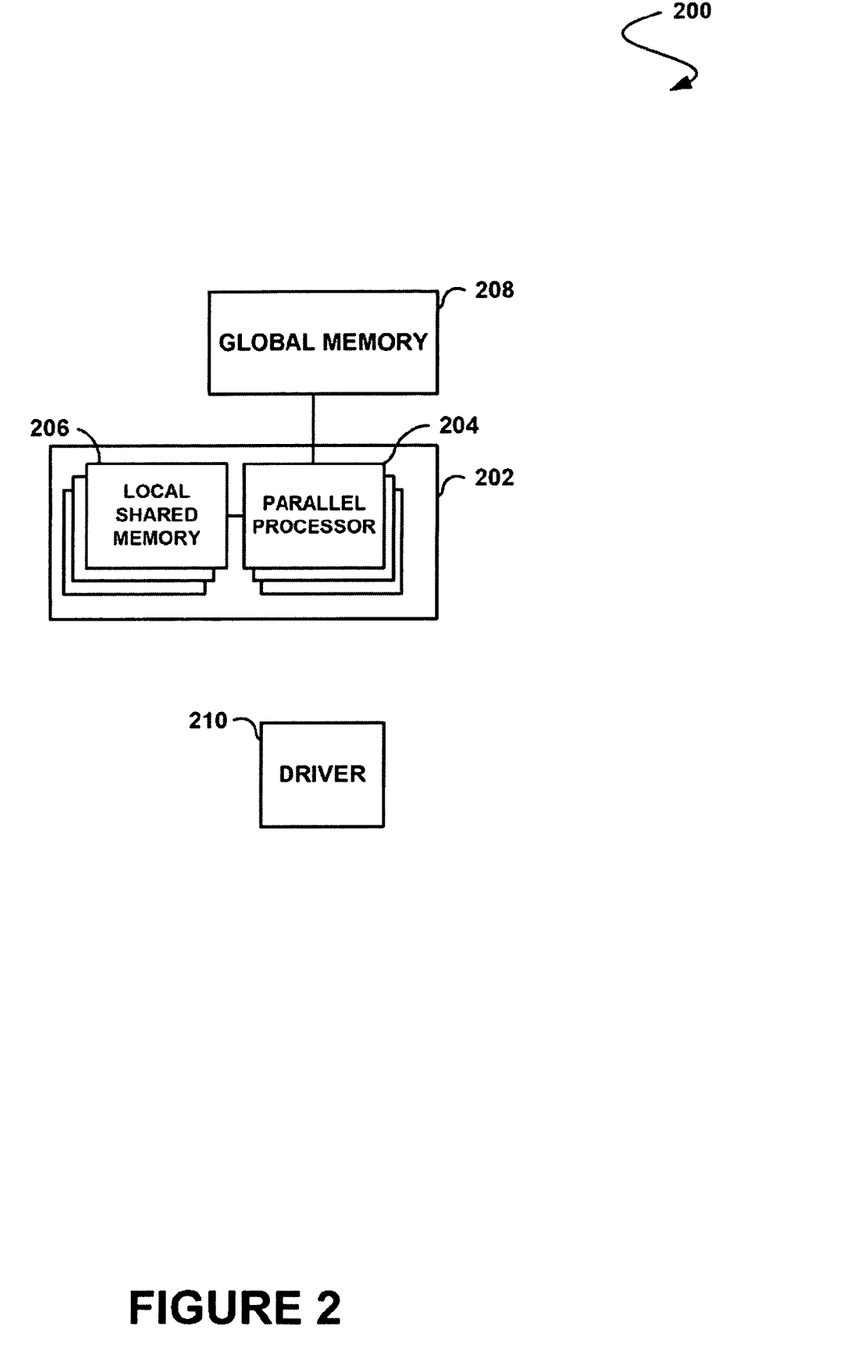
FIG. 2 shows a system for performing parallel ray tracing traversal and intersection, in accordance with one embodiment of the present invention.

FIG. 2 shows a system 200 for performing parallel ray tracing traversal and intersection, in accordance with one embodiment of the present invention. As an option, the present system may be implemented to carry out the method of FIG. 1. Of course, however, the present system may be implemented in any desired environment. It should also be noted that the aforementioned definitions may apply during the present description.

As shown, a parallel processing architecture 202 is provided. Such parallel processing architecture includes a plurality of parallel processors 204. While not shown, such parallel processors may be capable of operating on a predetermined number of threads. To this end, each of the parallel processors may operate in parallel, while the corresponding threads may also operate in parallel.

In the present embodiment, such parallel processing architecture includes a SIMD architecture. In such embodiment, the threads being executed by the processor are collected into groups such that at any instant in time all threads within a single group are executing precisely the same instruction but on potentially different data. In one embodiment, this group of threads operating in such fashion may be referred to as a "warp." Further, the predetermined number of threads may refer to a "warp size" of the corresponding processor.

In one possible embodiment, the foregoing parallel processing architecture may include a graphics processor or any other integrated circuit equipped with graphics processing capabilities [e.g. in the form of a chipset, system-on-chip (SOC), core integrated with a CPU, discrete processor, etc.]. In still another embodiment, the foregoing parallel processing architecture may include a processor with one or more vector processing elements such as the Cell processor, referring to the Cell Broadband Engine microprocessor architecture jointly developed by Sony®, Toshiba®, and IBM®.

With continuing reference to FIG. 2, the parallel processing architecture may include local shared memory 206. Each of the parallel processors of the parallel processing architecture may read and/or write to its own local shared memory. This shared memory may consist of physically separate memories associated with each processor or it may include separately allocated regions of one or more memories shared amongst the processors. Further, in the illustrated embodiment, the shared memory may be embodied on an integrated circuit on which the processors of the parallel processing architecture are embodied.

Still yet, global memory 208 may be included. In use, such global memory is accessible to all the processors of the parallel processing architecture. As shown, such global memory may be embodied on an integrated circuit that is separate from the integrated circuit on which the processors of the aforementioned parallel processing architecture are embodied. While the parallel processing architecture is shown to be embodied on the various integrated circuits of FIG. 2 in a specific manner, it should be noted that the system components may or may not be embodied on the same integrated circuit, as desired.

Still yet, the present system of FIG. 2 may further include a driver 210 for controlling the parallel processing architecture, as desired. In one embodiment, the driver may include a library, for facilitating such control. For example, such library may include a library call that may instantiate the functionality set forth herein. Further, in another embodiment, the driver may be capable of providing general computational capabilities utilizing the parallel processing architecture (e.g. a graphics processor, etc.). An example of such a driver may be provided in conjunction with the CUDA™ framework provided by NVIDIA Corporation. In use, the driver may be used to control the SIMD architecture to operation in accordance with the method of FIG. 1.

Figure 3:
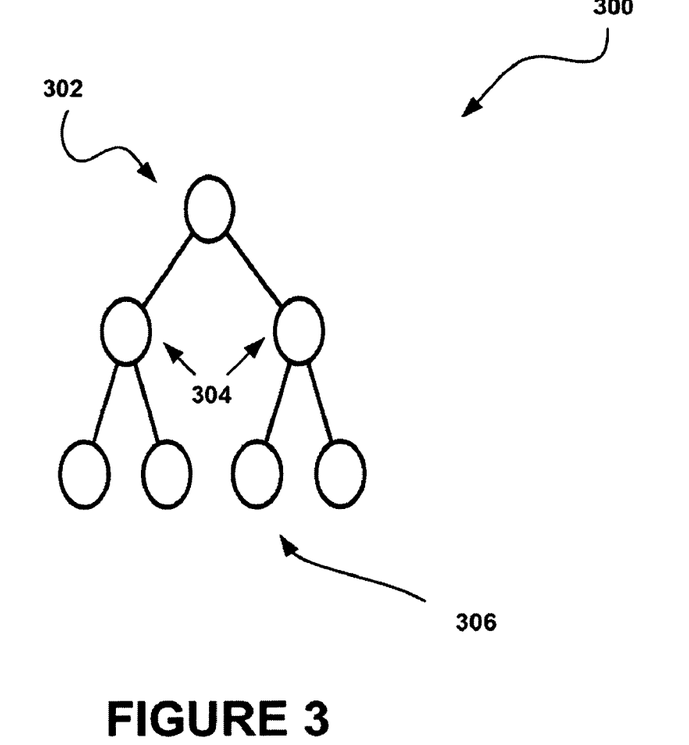
FIG. 3 shows a data structure for parallel ray tracing traversal and intersection utilizing a SIMD processing architecture, in accordance with one embodiment of the present invention.

FIG. 3 shows a data structure 300 for parallel ray tracing traversal and intersection utilizing a SIMD processing architecture, in accordance with one embodiment of the present invention. As an option, the data structure may be utilized in the context of the details of FIGS. 1-2. Of course, however, the data structure may be utilized in any desired environment. Additionally, the aforementioned definitions may apply during the present description.

As shown, the data structure includes a parent node 302, two child nodes (e.g. inner nodes) 304, and four leaf nodes 306. In operation, a ray tracing traversal operation is performed on the data structure, utilizing a SIMD processing architecture. Additionally, a ray tracing intersection operation is performed in parallel with the ray tracing traversal operation on the data structure, utilizing the same SIMD processing architecture.

Performing the ray tracing intersection operation in parallel with the ray tracing traversal operation utilizing the same SIMD architecture may be accomplished in a variety of ways. In one embodiment, at least a portion of code utilized for performing the ray tracing traversal operation may be the same as at least a portion of code utilized for performing the ray tracing intersection operation.

For example, it is possible to share a portion of the code for performing inner node and primitive (e.g. triangle, etc) intersection tests. In one embodiment, a triangle intersection algorithm may be used which starts by computing the distance from a ray origin to a plane of the triangle, along a ray direction, in the context of kd-tree inner node traversal.

As an option, the distance computation code may be placed outside both intersection tests (node and triangle), and executed without divergence on a SIMD architecture. For an example, Table 1 shows pseudocode for a unified implementation of a kernel using kd-tree traversal with short stack, in accordance with one embodiment.

In this case, memory layouts of inner nodes and triangles may match each other for the part that is utilized by common code, but the memory layouts do not necessarily need to match for non-common parts of the code. Additionally, structures of the inner nodes and the triangles may be different sizes. In the exemplary implementation shown in Table 1, the inner node plane is stored as one four-vector, and the triangle intersection data is stored as three four-vectors. The distance-to-plane test is performed unconditionally, and then, based on whether the data indicates inner node or triangle, the computation may continue accordingly.

The two other four-vectors of a triangle are fetched only in the code specific to the triangle intersection test. In this way, the memory consumption of an inner node is one four-vector. This memory savings is due to the fact that only a part of the code is shared. In the case that inner nodes use exactly the same intersection code as triangles, their data layout, and consequently memory consumption, may be the same.

TABLE 1

```
struct RayStruct
{
   float orig[3];
   float dir [3];
   RayResult* result;
};
_device_ void rtKernelUnified(RayResult* results,
                              float4* rays)
{
   int rayidx =
      (int)threadIdx.x + RAY_BLOCK_WIDTH * (int)threadIdx.y +
      RAY_BLOCK_WIDTH * RAY_BLOCK_HEIGHT *
      ((int)blockIdx.x + RAY_GRID_WIDTH * (int)blockIdx.y);
   RayStruct* aux = shared + threadIdx.x +
            (threadIdx.y * RAY_BLOCK_WIDTH);
   // load ray
   float4 ray0 = FETCH(rays, rayidx);
   float4 ray1 = FETCH(rays, rayidx + RAY_BUFFER_SIZE);
   aux->orig[0] = ray0.x;
   aux->orig[1] = ray0.y;
   aux->orig[2] = ray0.z;
   aux->dir[0]  = ray1.x;
   aux->dir[1]  = ray1.y;
   aux->dir[2]  = ray1.z;
   aux->result  = &results[_float_as_int(ray1.w)];
   aux->result->tidx = -1;
   if (ray0.w == 0.f)
      return;
   // initialize short stack
   stack.init( );
   int    addr = 0;
   float tmin = 0.f;
   float tmax = 1.f;
   float tbest;
   // termination condition
   while(fabsf(tmin) < 1.f)
   {
      float4 node = FETCH(unified, addr);
      int    type = _float_as_int(node.w) & 3;
```

TABLE 1-continued

```
      int    axis = _float_as_int(node.w) & 12; // axis*4
      // address of right child
      int ptr = _float_as_int(node.w) >> 4;
      // stack pop
   if (type == TYPE_END_OF_TRIANGLES) // end-of-triangles marker
   {
      // if no triangle was hit, continue at the end of the ray
      tmin = tmax;
      // pop short stack
      stack.pop(addr, tmax);
   } else
   {
      addr++; // get address of left child
      // first triangle?
      if (type == TYPE_FIRST_TRIANGLE)
      {
         tmin -= EPSILON;
         tbest = tmax + EPSILON;
      }
      // get axes
      int ku = BYTE_OFFSET(int, knext, axis);
      int kv = BYTE_OFFSET(int, knext, axis+4);
      // get ray parameters from shared memory
      float origk  = BYTE_OFFSET(float, aux, axis);
      float origku = BYTE_OFFSET(float, aux, ku);
      float origkv = BYTE_OFFSET(float, aux, kv);
      float dirk   = BYTE_OFFSET(float, aux, axis+12);
      float dirku  = BYTE_OFFSET(float, aux, ku+12);
      float dirkv  = BYTE_OFFSET(float, aux, kv+12);
      // this is the shared distance-to-plane computation
      float nd = 1.f / (dirk + node.x*dirku + node.y*dirkv);
      float t = (node.z-origk-node.x*origku-node.y*origkv) * nd;
      // also the comparison against tmin is shared
      bool t_gt_tmin = (t > tmin);
      if (type == TYPE_INNER_NODE) // inner node
      {
         // swap near/far?
         // faster way to say "if ((dirk >= 0) == (tmin >= t))"
         if ((_float_as_int(dirk)^_float_as_int(tmin-t)) >= 0)
            SWAP(addr, ptr);
         if (t_gt_tmin)
         {
            // push into short stack
            if (t < tmax)
               stack.push(ptr, tmax);
            tmax = fminf(tmax, t);
         }
      } else // triangle node
      {
         // next triangle address
         if (t_gt_tmin && t < tbest)
         {
            float4 v11 = FETCH(unified, addr);
            float pu = origku + t * dirku + v11.z;
            float pv = origkv + t * dirkv + v11.w;
            float a2, a3;
            float4 v22;
            if ((a2 = pu * v11.y + pv * v11.x) >= 0)
            {
               v22 = FETCH(unified, addr+1);
               if ((a3 = pu * v22.x + pv * v22.y) >= 0 &&
                   (a2+a3) <= 1.f)
               {
                  // store the result
                  tbest = t;
                  tmax = -1.f;
                  aux->result->tidx = _float_as_int(v22.w);
                  aux->result->t    = t;
               }
            }
         }
         // next triangle address
         addr += 2;
      }
   }
}
```

In addition to using common code for performing the ray tracing intersection operation in parallel with the ray tracing traversal operation, geometric representations may also be changed with respect to at least one of the ray tracing traversal operation and the ray tracing intersection operation. For example, standard geometric representations (i.e. commonly used geometric representations or geometric representations utilized by those skilled in the art) may be changed with respect to at least one of the ray tracing traversal operation and the ray tracing intersection operation. In one embodiment, the code may be utilized to encode a triangle and a parallelepiped using the same mathematical representation. As an option, the mathematical representation may include a dot product of a three dimensional point and a four dimensional vector.

In the context of the present description, a parallelepiped includes any 6-faced polyhedron all of whose faces are parallelograms lying in pairs of parallel planes. In one embodiment, the parallelepiped may include a box. In this case, the box may be an axis-aligned box or a skewed box.

As an example, in a bounding volume hierarchy, a ray traversal intersects a ray against a bounding volume (e.g. an axis-aligned box) that represents the bounds of a node. In this case, intersection testing may be accomplished at leaf nodes (i.e. nodes with no child nodes). Furthermore, intersection code for inner nodes and triangles may be completely combined using a suitable primitive that can represent either a triangle or a box.

In this example, a plane may be defined using a single four-vector. The components of such four-vector are traditionally named x, y, z, and w. Point (x,y,z) lies on plane "P" if and only if P.x*x+P.y*y+P.z*z+P.w equals zero. This is the dot product between a 3D point and 4D vector, and such condition may be written as dot(P,x)==0.

Further, in this example, a plane with constant thickness may be defined, where the point is considered to lie in the plane if and only if 0<=dot(P,x)<=1. In this case, the plane specifies an infinite subspace. Additionally, an intersection of three such subspaces may define the parallelepiped. In one embodiment, such parallelepiped may include a box. In various embodiments, such box may include any scaled, rotated, slanted, or skewed box. The box may be skewed in any way such that the opposing faces of the box remain parallel to each other.

An intersection of three planes of constant thickness may also specify a triangle. To be precise, such intersection may also specify a parallelogram-shaped flat area. This parallelogram-shaped flat area may be divided in half, yielding any triangle to be represented. When intersecting a triangle, barycentric coordinates are computed at the intersection. These barycentric coordinates may be used for discarding an unwanted half of the parallelogram.

It should be noted that it is highly likely that barycentric coordinates may be used for other purposes (e.g. shading purposes, etc.). Thus, computing the barycentric coordinates may be independently useful. Also, when it is known that the represented primitive is completely flat, an infinitely thin slab is not represented using the plane with constant thickness since this may result in infinities in formulas. Instead, the plane corresponding to the triangle plane is left thick and the plane is treated as infinitely thin in the code. In this way, only one conditional assignment is utilized.

Because of this common representation, ray vs. box and ray vs. triangle intersection may be performed using the same code. This eliminates the SIMD divergence due to different intersection code sets.

It should be noted that the constant thickness plane based box discussed above allows for more flexibility in specifying the hierarchy than traditional axis-aligned bounding boxes. For instance, oriented bounding boxes (OBB), where the boxes are orthogonal but not necessarily axis-aligned, are commonly used in collision testing algorithms. This is because OBBs fit many types of data better than some other bounding volumes. Therefore, freedom in box shape may be utilized to give performance benefits in ray tracing as well.

Table 2 shows a pseudocode for the construction of constant thickness planes for an axis-aligned box, in accordance with one embodiment. Additionally, Table 3 shows a pseudocode for the construction of constant thickness planes for a triangle, in accordance with one embodiment. Table 4 shows a pseudocode for an intersection test between a ray and a primitive specified by three constant thickness planes, in accordance with one embodiment.

TABLE 2

```
void constructFatBox(Vector4 fat[3], const Vector3& bmn, const
Vector3& bmx)
{
    fat[0].set(1, 0, 0, -bmn.x);
    fat[1].set(0, 1, 0, -bmn.y);
    fat[2].set(0, 0, 1, -bmn.z);
    // normalize so that box maximum coordinates yield 1.0
    fat[0] *= 1.f / (bmx.x - bmn.x);
    fat[1] *= 1.f / (bmx.y - bmn.y);
    fat[2] *= 1.f / (bmx.z - bmn.z);
}
```

TABLE 3

```
void constructFatTri(Vector4 fat[3], const Vector3 tri[3])
{
    // triangle normal
    Vector3 n = cross(tri[1]-tri[0], tri[2]-tri[0]);
    // triangle plane, arbitrary thickness
    fat[0].set(n.x, n.y, n.z, -dot(n, tri[0]));
    // normal of plane between vertices 0 and 1
    Vector3 na = cross(n, tri[1]-tri[0]);
    // plane between vertices 0 and 1
    fat[1].set(na.x, na.y, na.z, -dot(na, tri[0]));
    // normalize so that vertex 2 yields 1.0
    fat[1] *= 1.f / (dot34(tri[2], fat[1]));
    // normal of plane between vertices 0 and 2
    Vector3 nb = cross(n, tri[2]-tri[0]);
    // plane between vertices 0 and 2
    fat[2].set(nb.x, nb.y, nb.z, -dot(nb, tri[0]));
    // normalize so that vertex 1 yields 1.0
    fat[2] *= 1.f / (dot34(tri[1], fat[2]));
}
```

TABLE 4

```
bool intersectRayFat(Vector3 orig, Vector3 dir, Vector4 fat[3], bool
triangle)
{
    float o0 = dot34(orig, fat[0]);
    float o1 = dot34(orig, fat[1]);
    float o2 = dot34(orig, fat[2]);
    float d0 = dot33(dir, fat[0]);
    float d1 = dot33(dir, fat[1]);
    float d2 = dot33(dir, fat[2]);
    float id0 = 1.f / d0;
    float id1 = 1.f / d1;
    float id2 = 1.f / d2;
    float t0a = -o0 * id0;
    float t1a = -o1 * id1;
    float t2a = -o2 * id2;
    float t0b = t0a + id0;
    float t1b = t1a + id1;
    float t2b = t2a + id2;
    // this small part of code is triangle-specific, but may
    // use the barycentric coordinates in any case
    if (triangle)
    {
```

TABLE 4-continued

```
    // compute barycentric coordinates
    float u = (t0a–t1a) * d1;
    float v = (t0a–t2a) * d2;
    // discard the unwanted half of parallelogram
    if (u+v > 1.f)
        return false;
    // flatten the triangle plane
    t0b = t0a;
}
float t0 = MAX3(MIN(t0a, t0b), MIN(t1a, t1b), MIN(t2a, t2b));
float t1 = MIN3(MAX(t0a, t0b), MAX(t1a, t1b), MAX(t2a, t2b));
return (t0 <= t1 && t0 <= 1.f && t1 >= 0.f);
```

In still another embodiment, the code for ray traversal and intersection operations may be combined by using a spatial acceleration structure (i.e. data structure) based on tetrahedra. In this case, tetrahedra are polyhedron composed of four triangular faces, three of which meet at each vertex. Since intersection with a tetrahedron may be expressed as a ray-triangle intersection, threads in a SIMD group may intersect rays with triangles and traverse through empty nodes by executing the same code with the exception of a few instructions.

Figure 4:
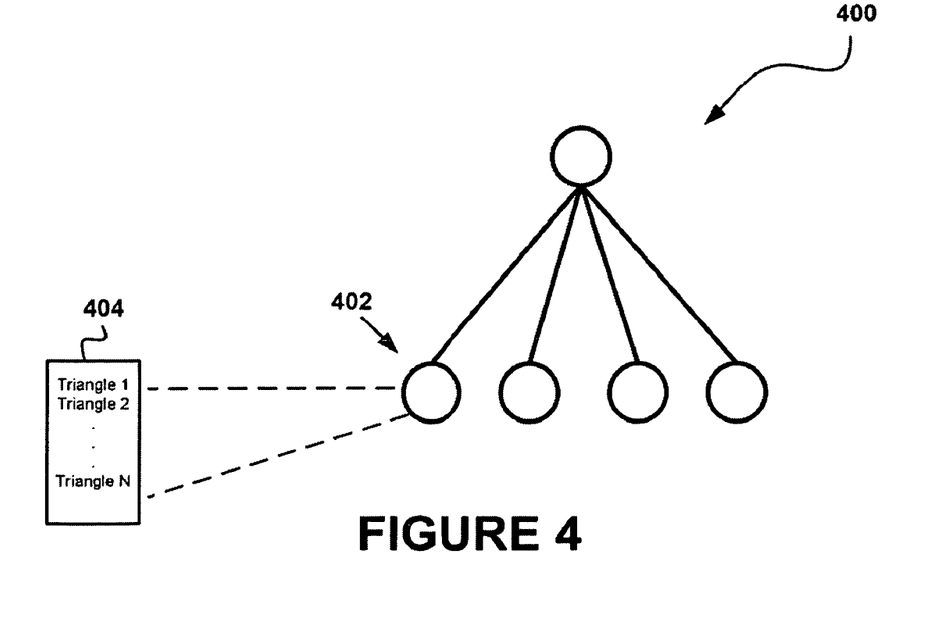
FIG. 4 shows a data structure for performing a traverse operation and an intersect operation by iterating through a list of triangles and performing ray-triangle intersections, in accordance with one embodiment of the present invention.

In one embodiment, both a traverse operation and an intersect operation may be expressed as iterating through a list of triangles and performing ray-triangle intersections, with occasional jumps when a ray hits a triangle. In this case, a jump refers to a deviation from iterating through the list of triangles. FIG. 4 shows a data structure 400 for performing a traverse operation and an intersect operation by iterating through a list of triangles and performing ray-triangle intersections, in accordance with one embodiment of the present invention. As an option, the data structure may be utilized in the context of the details of FIGS. 1-3. Of course, however, the data structure may be utilized in any desired environment. Again, the aforementioned definitions may apply during the present description.

As shown, a tetrahedral node 402 in the data structure may include a list of triangles 404, beginning with object triangles (if any) and ending with face triangles. In this case, object triangles refer to ordinary triangles belonging to objects in a scene or global data set. Face triangles refer to triangles that form the face of a tetrahedral node in the data structure. In this case, face triangles serve as pointers in the data structure. For example, if a ray intersects a face triangle the ray moves to the next tetrahedral node. In a spatial partition, the next tetrahedral node may be directly adjoining. For example, in a BVH the next tetrahedral node may be the next node in a list (e.g. corresponding to a child or sibling node).

Each triangle may include a pointer (or index offset) representing a jump to take if that triangle is an intersection. For face triangles, this may be the beginning of a new list of triangles, namely the contents of an adjoining tetrahedral node in the data structure. For object triangles, this might be an associated shader.

If object triangles are clipped to the tetrahedral node faces and the rays being traced are restricted to shadow rays (for which the existence of any intersecting triangle, and not the first intersecting triangle, is desired), this may be sufficient. If this is not the case, more logic may be employed to keep track of the closest intersection (e.g. a "t" value and jump pointer, where "t" is the parameterized distance along the ray from the ray origin). Accordingly, when a face triangle is intersected, a resulting "t" value may be compared to the closest intersection to determine which jump to take. As an option, this additional implementation may be distilled into a small number of instructions in the inner loop that are predicated out for rays that have not reached the face triangles.

It should be noted that the tetrahedral data structure may be constructed using various techniques. For example, the data structure may be constructed using a surface area heuristic (SAH) based tetrahedral bounding volume hierarchy. In another embodiment, the data structure may be a SAH-based spatial partition similar to a k-d tree, in which the candidate splitting planes embed one edge of the tetrahedral node and intersect another.

In still another embodiment, the tetrahedral node face triangles in a tetrahedral partition may be used as "triangle adjacency pointers." In this case, an adjoining tetrahedral node may be subdivided on the opposite side of a tetrahedral node face and that face may be with a triangle corresponding to smaller, subdivided tetrahedral nodes. Thus, a ray that intersects one of the new, smaller "face triangles" may jump to the smaller subdivided node on the opposite side of the small face triangle.

If the interior node face triangles are fully subdivided, the original face triangles may not be necessary and rays may jump straight to the next leaf node. In this scenario the interior nodes themselves may never be visited and hierarchical traversal may be eliminated. As an option, this subdivision of face triangles could be done in lazy fashion by leaving the large face triangle in place and inserting small face triangles that may be tested first.

When a ray hits a large face triangle and jumps to the tetrahedral node on the other side that is not a leaf node, the ray may traverse down the tree until the ray reaches a leaf and then it may insert that face triangle of the leaf in the triangle list of the originating tetrahedral node. By inserting the small face triangle before the large face triangle in the ordered list, future rays may test a jump directly to the leaf node before the future rays test a jump to the adjoining interior node.

Depending on the depth of the sub-tree at that adjoining node, and the percentage of ray's that will go into this particular leaf node, this may decrease traversal efficiency for future triangles. For example if only one stray ray happens to go into a part of the face triangle that requires deep subdivision, many new face triangles are added to the set of triangles that must be intersected by all rays that pass through this node. In one case, a hybrid strategy may be used to add only one level of subdivided face triangles at a time, such that each ray passing through a face triangle may add only one face triangle to the list. Thus, the face triangle that the ray passed through may be replaced by two new face triangles corresponding to the two children of the interior tetrahedral node pointed to by the original face triangle.

In one embodiment, space may be allocated in each tetrahedral node triangle list for all object triangles and all possible face triangles. In this case, the list of face triangles may grow backwards from the end of the list. As an option, the jump pointer field for object triangles may be used as a jump pointer rather than repurposing those bytes as something else (e.g. a shader identification). In this case, the final object triangle may embed a skip to the first face triangle.

As an option, leaf nodes of a kd-tree may be augmented with ropes. While traversing a rope-augmented tree, rather than restarting the loop by popping a stack, a "rope" is followed. Ropes encode the traversal trajectory in the leaves of the tree by pointing to the next node in traversal order. If a ray does not intersect any triangle in a leaf, the ray follows the rope corresponding to its direction to decide where to go next.

Because leaf nodes may correspond to axis-aligned boxes, there may be six ropes per leaf, one per face of the box. Which side of the box (if any) the ray intersects uniquely decides which rope to follow. This decision may also be reduced to ray triangle intersection. In one unified implementation, each list of leaf triangles may be immediately followed by another list of triangles defining the bounds of the leaf node. The pseudocode in Table 5 illustrates the run-time traverse-and-intersect kernel where the "ropes" have been constructed in a preprocess. Table 6 shows pseudocode for the one case of testing shadow rays (find any intersection, not just first intersection) against triangles that have been clipped to the bounding volumes such that a ray will not intersect an object triangle at a point outside the node.

TABLE 5

```
// Ray tracks origin, direction, min and max "t" values of segment of
// interest
typedef Ray {
   float3 origin;
   float3 direction;
   float min_T;        // start of current ray segment
   float max_T;        // end of ray segment (i.e. hit the
light)
}
// Node is a list of triangles. First "object triangles" then
//"face triangles"
typedef Triangle * Node;
// Triangle stores 3 vertices and a "jump pointer"
// For object triangles, jump pointer unused - might store triangle
//shader here
// For face triangles, jump pointer is a new list of tris - the
//adjacent node
typedef Triangle {
   float3 v0, v1, v2;              // vertices
   Node jump;          // if ray hits this triangle, jump here
   bool isFace;        // is this a face triangle?
}
// intersect( ) returns t value of hitpoint, or 0 if no hit or hit with
t<0
float intersect(Ray, Triangle);
```

TABLE 6

```
//Takes a ray and a starting node and walks the ray through the node
//until it hits a triangle. If the triangle is an object triangle,
//process is complete - return the triangle. If the triangle is a face
//triangle, jump to the list of triangles of the node on the opposite
//side.
//
//Returns: true if the ray hits an object triangle before max_T, else
//false
//
// Assumptions:
// - the ray begins inside the node
// - object triangles, if any, precede face triangles in the list
// - the root of the tree contains only object triangles (i.e. the
//background)
// - the ray is a shadow ray (find any intersection, not just closest)
bool traverse_and_intersect_shadow(ray, node)
{
   Triangle *tri = node;
   while (1)
   {
      // returns 0 if no intersection
      float hit_T = intersect(ray, tri);
      if (hit_T)
      {
         bool hitBeforeMax = (hit_T < ray.max_T);
         if (tri.isFace)
         {
            // did we hit the face before the light source?
            if (hitBeforeMax)
            {
               // yes: jump to next node
               tri = tri.jump;
            }
            else
            {
```

TABLE 6-continued

```
               // face further than light source: return NULL
               return false;
            }
         }
         else
         {
            if (hitBeforeMax)
            {
               return true;
            }
         }
      }
      else
      {
         ++tri;           // advance to next tri in list
      }
   }
}
```

Table 7 shows an example of pseudocode for representing kd-tree splitting planes as full-fledged triangles. In this way, the traversal step appears more like ray-triangle intersection.

TABLE 7

```
// A Triangle should fit into 3 word4s;
// Assume an internal Triangle's left child
// is stored immediately following its parent
typedef Triangle:
   float3 v0
   float3 v1
   float3 v2
   // for internal Triangles, this points to
   // its right child
   // for terminal Triangles, this points to the
   // next Triangle in the list, or root if it
   // is the last in the list
   pointer rightChild
   // -1: for an object triangle
   // 0: for x-axis
   // 1: for y-axis
   // 2: for z-axis
   int splitAxis
   // leftover storage for something else
   word leftover
def kdRestart(ray, root):
   tMin = 0
   tMax = infinity
   tBest = infinity
   // init the current triangle to be the root
   currentTriangle = root
   while tMin < infinity:
      // fetch triangle from memory
      tri = fetchTriangle(currentTriangle)
      // intersect the ray with the current triangle
      intersect(ray, tri.v0, tri.v1, tri.v2, t, b0, b1)
      // resolve the facing of the triangle wrt the ray
      hitAfterMin = (t > tMin)
      // branch on internal/terminal triangle
      type = tri.splitAxis
      if type >= 0:
         // need to traverse the left or right child next?
         if traverseNear == ray.dir[type] > 0:
            // set the next triangle to traverse to be my left child
            tri.right = tri + 1
         // update bounds
         if traverseNear:
            tMax = min(tMax, t)
         else:
            tMin = max(tMin, t)
      else:
         // intersect the triangle proper?
         if hitAfterMin and (t < tBest) and (t < tMax) and (b0 + b1 <= 1):
            // this will break the loop on the next restart
            tMax = infinity
            // set the results
            tBest = t
            hitTriangle = currentTriangle
```

TABLE 7-continued

```
// advance to next child
currentTriangle = tri.right
// need to restart?
if currentTriangle == root:
    tMin = tMax
    tMax = infinity
```

It should be noted that, although the preceding examples and pseudocode are described in the context of using triangles, such examples may be equally applicable and/or configurable for any geometric primitive.

Figure 5:
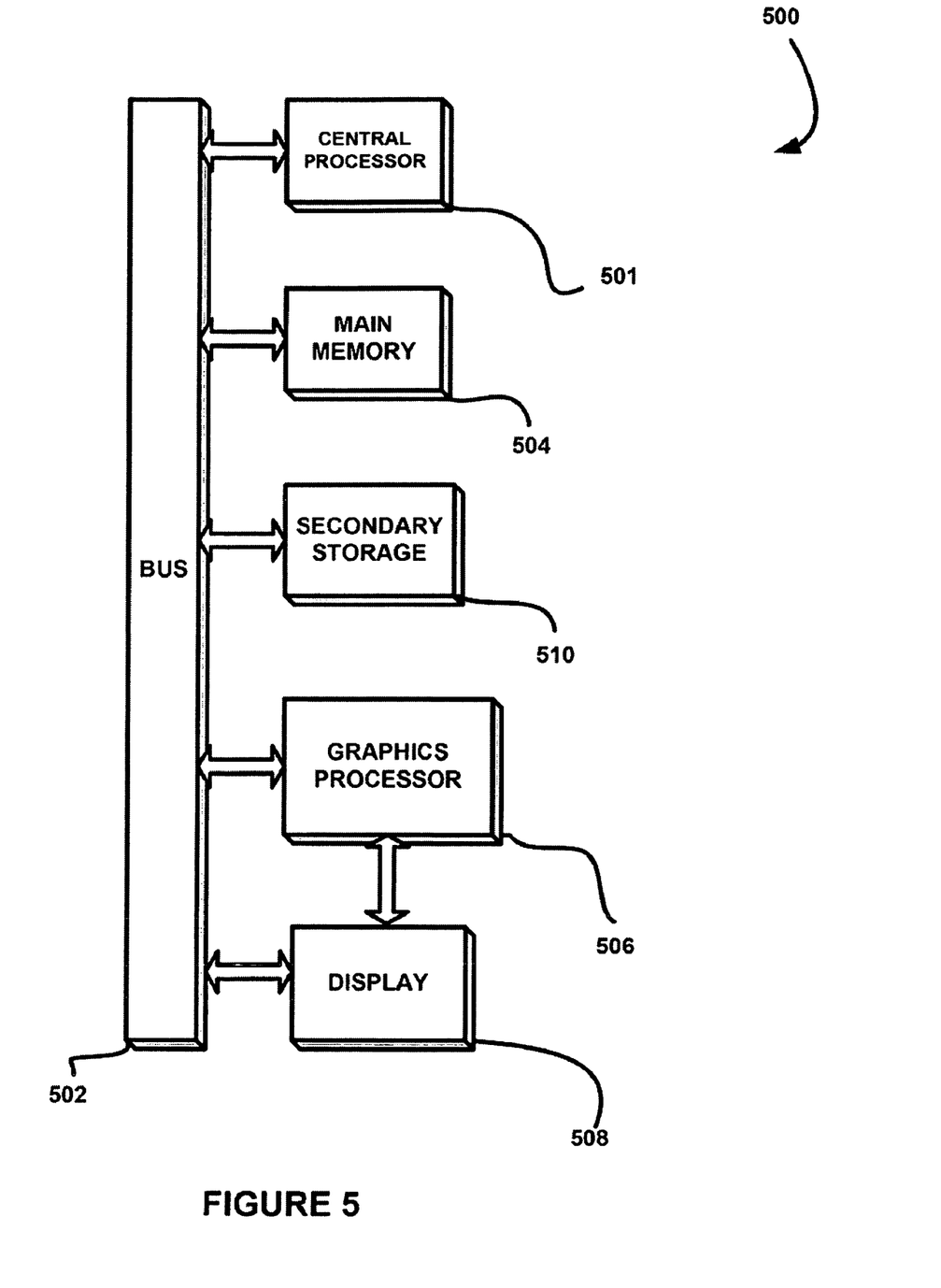
FIG. 5 illustrates an exemplary system in which the various architecture and/or functionality of the various previous embodiments may be implemented.

FIG. 5 illustrates an exemplary system in which the various architecture and/or functionality of the various previous embodiments may be implemented. As shown, a system 500 is provided including at least one host processor 501 which is connected to a communication bus 502. In one embodiment, the host processor may represent a plurality of processors.

In this case, each of the processors may include a plurality of threads. As an option, each of the processors may run in parallel as a parallel processor architecture. The system also includes a main memory 504. Control logic (software) and data are stored in the main memory which may take the form of random access memory (RAM).

The system may also include a graphics processor 506 and a display 508, i.e. a computer monitor. In one embodiment, the graphics processor may include a plurality of shader modules, a rasterization module, etc. Each of the foregoing modules may even be situated on a single semiconductor platform to form a GPU.

In one embodiment, the graphics processor may represent a plurality of processors. In this case, each of the processors may include a plurality of threads. As an option, each of the processors may run in parallel as a parallel processor architecture.

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional CPU and bus implementation. Of course, the various modules may also be situated separately or in various combinations of semiconductor platforms per the desires of the user.

The system may also include a secondary storage 510. The secondary storage includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory and/or the secondary storage. Such computer programs, when executed, enable the system to perform various functions. Memory, storage and/or any other storage are possible examples of computer-readable media.

In one embodiment, the architecture and/or functionality of the various previous figures may be implemented in the context of the host processor, graphics processor, an integrated circuit (not shown) that is capable of at least a portion of the capabilities of both the host processor and the graphics processor, a chipset (i.e. a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system may take the form of a desktop computer, lap-top computer, and/or any other type of logic. Still yet, the system may take the form of various other devices including, but not limited to, a personal digital assistant (PDA) device, a mobile phone device, a television, etc.

Further, while not shown, the system may be coupled to a network [e.g. a telecommunications network, local area network (LAN), wireless network, wide area network (WAN) such as the Internet, peer-to-peer network, cable network, etc.) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
identifying a scene containing at least one object, the at least one object comprising a plurality of triangles of a first type including a particular triangle of the first type;
organizing the at least one object of the scene into a data structure comprising a plurality of tetrahedral nodes including a first tetrahedral node and a second tetrahedral node, the first tetrahedral node of the data structure comprising a first list of triangles, and the second tetrahedral node of the data structure comprising a second list of triangles including the particular triangle of the first type;
performing a ray tracing traversal operation for determining that the ray intersects with the first tetrahedral node; and
performing a ray tracing intersection operation by:
iterating through the first list of triangles of the first tetrahedral node of the data structure and intersecting the ray with a triangle of a second type in the first list of triangles of the first tetrahedral node, and
in response to the intersection of the ray with the triangle of the second type, jumping to the second tetrahedral node pointed to by the triangle of the second type, iterating through the second list of triangles of the second tetrahedral node including the particular triangle of the first type, intersecting the ray with the particular triangle of the first type, and shading the intersection between the ray and the particular triangle of the first type;
wherein at least a portion of code utilized for performing the ray tracing traversal operation is the same as at least a portion of code utilized for performing the ray tracing intersection operation.

2. The method of claim 1, wherein standard geometric representations are changed with respect to at least one of the ray tracing traversal operation and the ray tracing intersection operation.

3. The method of claim 1, wherein the code identifies intersections of the ray and a plane.

4. The method of claim 1, wherein the code encodes a triangle and a parallelepiped using the same mathematical representation.

5. The method of claim 4, wherein the parallelepiped includes a box.

6. The method of claim 5, wherein the box includes an axis-aligned box.

7. The method of claim 5, wherein the box includes a skewed box.

8. The method of claim 4, wherein the mathematical representation includes a dot product of a three dimensional point and a four dimensional vector.

9. The method of claim 1, wherein boundaries of the second tetrahedral node are defined utilizing the second list of triangles.

10. The method of claim 1, wherein the ray tracing traversal operation utilizes a rope which points the ray to a next tetrahedral node in a traversal order.

11. The method of claim 10, wherein if the ray tracing intersection operation does not intersect a triangle in a leaf, the ray follows the rope corresponding to the ray's direction.

12. The method of claim 1, wherein the first list of triangles of the first tetrahedral node of the data structure starts with at least one triangle of the first type followed by at least one triangle of the second type, each of the triangles of the second type being pointers to a respective triangle in the data structure.

13. The method of claim 12, wherein, in response to the ray intersecting another triangle of the second type in the first list of triangles of the first tetrahedral node, the ray moves to a next tetrahedral node.

14. The method of claim 13, wherein the next tetrahedral node directly adjoins the first tetrahedral node.

15. The method of claim 1, wherein the data structure includes a kd-tree, and the at least a portion of code utilized for performing the ray tracing traversal operation which is the same as the at least a portion of code utilized for performing the ray tracing intersection operation includes code that computes a distance from an origin of the ray to a plane of the triangle of the second type in the first list of triangles of the first tetrahedral node, along a direction of the ray.

16. The method of claim 1, wherein the second list of triangles of the second tetrahedral node includes at least one triangle of the second type, each of the at least one triangles of the second type forming a respective face of the second tetrahedral node, and each of the at least one triangles of the second type being a pointer in the data structure.

17. The method of claim 1, wherein the at least a portion of code utilized for performing the ray tracing traversal operation which is the same as the at least a portion of code utilized for performing the ray tracing intersection operation includes code which is operable for intersecting both an empty tetrahedral node and intersecting the ray with the particular triangle of the first type.

18. The method of claim 1, wherein each of the triangles of the first type are object triangles belonging to a respective object of the at least one object in the scene, and each of the triangles of the second type are face triangles, each of which form a respective face of a tetrahedral node in the data structure.

19. A computer program product embodied on a non-transitory computer readable medium, comprising:
computer code for identifying a scene containing at least one object, the at least one object comprising a plurality of triangles of a first type including a particular triangle of the first type;
computer code for organizing the at least one object of the scene into a data structure comprising a plurality of tetrahedral nodes including a first tetrahedral node and a second tetrahedral node, the first tetrahedral node of the data structure comprising a first list of triangles, and the second tetrahedral node of the data structure comprising a second list of triangles including the particular triangle of the first type;
computer code for performing a ray tracing traversal operation for determining that the ray intersects with the first tetrahedral node; and
computer code for performing a ray tracing intersection operation by:
iterating through the first list of triangles of the first tetrahedral node of the data structure and intersecting the ray with a triangle of a second type in the first list of triangles of the first tetrahedral node, and
in response to the intersection of the ray with the triangle of the second type, jumping to the second tetrahedral node pointed to by the triangle of the second type, iterating through the second list of triangles of the second tetrahedral node including the particular triangle of the first type, intersecting the ray with the particular triangle of the first type, and shading the intersection between the ray and the particular triangle of the first type;
wherein at least a portion of the computer code utilized for performing the ray tracing traversal operation is the same as at least a portion of the computer code utilized for performing the ray tracing intersection operation.

20. An apparatus, comprising:
a data processing architecture for:
identifying a scene containing at least one object, the at least one object comprising a plurality of triangles of a first type including a particular triangle of the first type,
organizing the at least one object of the scene into a data structure comprising a plurality of tetrahedral nodes including a first tetrahedral node and a second tetrahedral node, the first tetrahedral node of the data structure comprising a first list of triangles, and the second tetrahedral node of the data structure comprising a second list of triangles including the particular triangle of the first type,
performing a ray tracing traversal operation for determining that the ray intersects with the first tetrahedral node, and
performing a ray tracing intersection operation by:
iterating through the first list of triangles of the first tetrahedral node of the data structure and intersecting the ray with a triangle of a second type in the first list of triangles of the first tetrahedral node, and
in response to the intersection of the ray with the triangle of the second type, jumping to the second tetrahedral node pointed to by the triangle of the second type, iterating through the second list of triangles of the second tetrahedral node including the particular triangle of the first type, intersecting the ray with the particular triangle of the first type, and shading the intersection between the ray and the particular triangle of the first type;
wherein at least a portion of code utilized for performing the ray tracing traversal operation is the same as at least a portion of code utilized for performing the ray tracing intersection operation.

21. The apparatus of claim 20, wherein the data processing architecture remains in communication with memory and a display via a bus.

22. The apparatus of claim 20, wherein the data processing architecture includes one or more vector processing elements.

23. The apparatus of claim 20, wherein the data processing architecture includes a graphics processor.

* * * * *